(No Model.) 2 Sheets—Sheet 1.
J. H. BLESSING.
APPARATUS FOR HEATING AND PURIFYING FEED WATER.
No. 412,912. Patented Oct. 15, 1889.
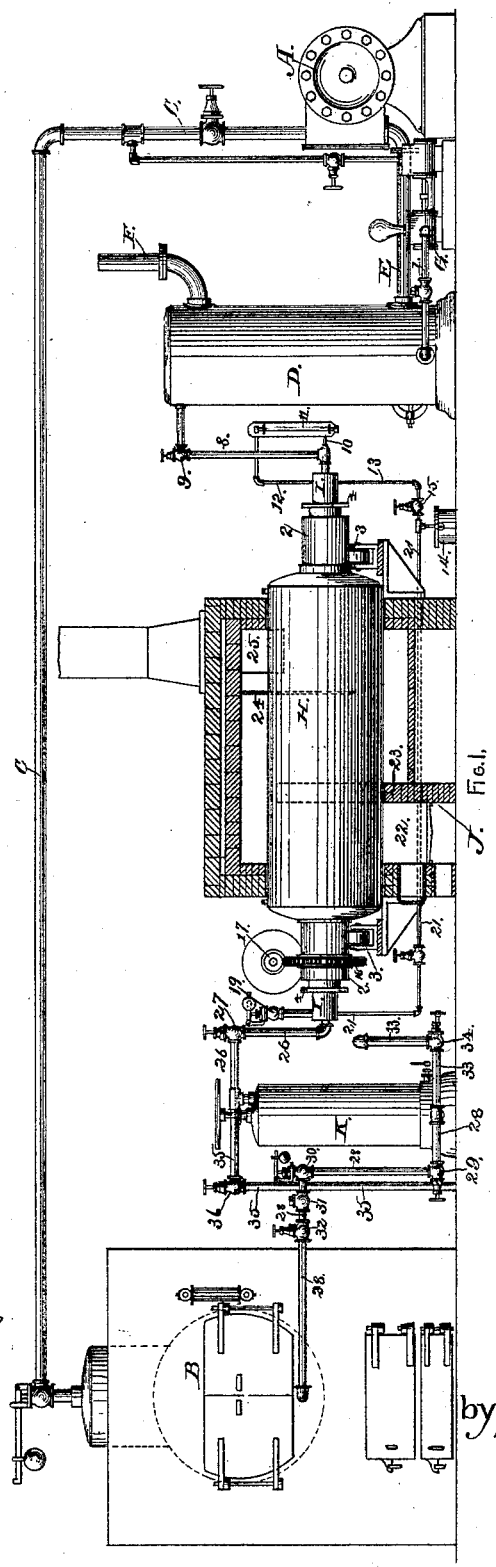
WITNESSES:
INVENTOR:
JAMES H. BLESSING,
by
William N. Law
Attorney.

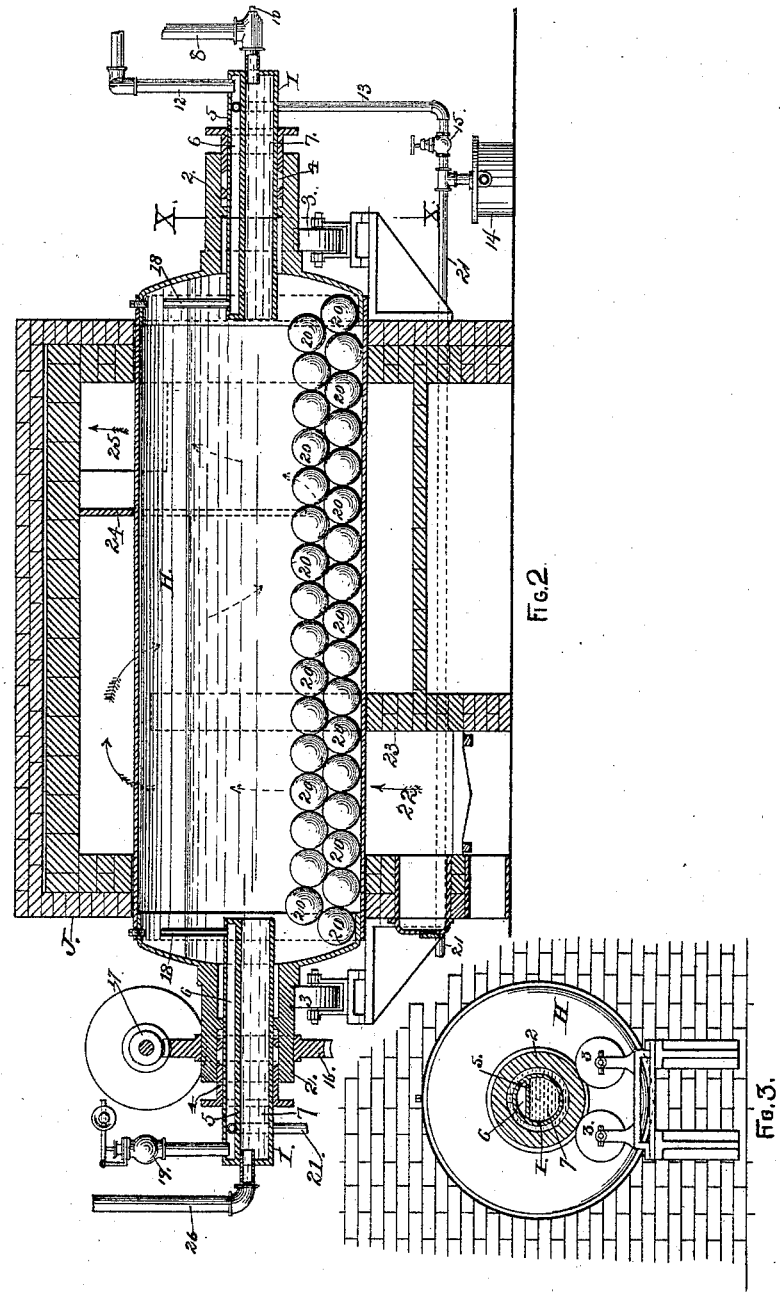

UNITED STATES PATENT OFFICE.

JAMES H. BLESSING, OF ALBANY, NEW YORK.

APPARATUS FOR HEATING AND PURIFYING FEED-WATER.

SPECIFICATION forming part of Letters Patent No. 412,912, dated October 15, 1889.

Application filed May 15, 1889. Serial No. 310,794. (No model.)

*To all whom it may concern:*

Be it known that I, JAMES H. BLESSING, of the city and county of Albany, in the State of New York, have invented new and useful Improvements in Apparatus for Heating and Purifying Feed-Water for Steam-Boilers, of which the following is a specification.

This invention consists of an apparatus comprising a feed-water heater, a revolving reheater which is exposed to the heat of a furnace, whereby the temperature of said feed-water is raised to such a degree that the impurities held in solution in said water will be precipitated, said reheater being provided with means for mechanically pulverizing solid impurities and preventing the formation of scale within said reheater, and a filtering apparatus fixed between said reheater and boiler, whereby any solid impurities that may be held in suspension in said feed-water will be removed therefrom by the process of filtration.

The object of this invention is to provide facilities for heating the feed-water for steam-boilers, precipitating by heat the impurities held in solution in said water, pulverizing said impurities and preventing the formation of scale in said reheater, filtering said water to remove the pulverulent matter, and thereby prevent the formation of scale in the boiler. This object I attain by the means illustrated in the accompanying drawings, which are herein referred to and form part of this specification, and in which—

Figure 1 is a side elevation of my apparatus, the furnace for the revolving reheater being shown in vertical section. Fig. 2 is an enlarged longitudinal section of the reheater and furnace; and Fig 3 is a transverse vertical section of the reheater at the line X X on Fig. 2, showing part of the furnace therefor.

As represented in the drawings, A is a steam-engine of the ordinary high-pressure type, and B the boiler for supplying steam to said engine through the steam-pipe C.

D is a feed-water heater of an ordinary type for heating the water by means of exhaust-steam from the engine A, said exhaust-steam being conveyed into said heater by means of an exhaust-pipe E and conveyed from said heater by means of an escape-pipe F. The feed-water is supplied to said heater by means of a steam-pump G or other suitable appliance. A feed-water pipe 1 connects the water-cylinder of the steam-pump G to the heater D for the purpose of conducting the feed-water into said heater.

H is the reheater, made in cylindrical form and provided at each end with a neck 2, having the form of a sleeve, the said necks forming journals, which bear upon rollers 3, so as to permit said reheater to be rotated on its axis. Each neck is provided with a stuffing-box 4, through which a pipe I is fitted to enter into the reheater H. The pipes I are held in a stationary condition at all times, the necks of the reheater H being fitted to revolve thereon. Said pipes are divided by a horizontal partition 5 into an upper passage 6 and a lower passage 7, the first of which is closed at both ends and the other being closed at its outer end only. The upper passages 6 are for steam or vapor under pressure, and the lower passages 7 are for the free circulation of the feed-water from one end of the reheater to the other. Into the end of the pipe I nearest the heater D is inserted a feed-water pipe 8, which connects with the upper part of the heater D, for conducting the heated water from said heater into the reheater H. The pipe 8 is provided with a stop-valve 9, by which communication through said pipe may be closed, and the lower end of said pipe is connected by a branch pipe 10 to the lower end of a water-gage 11, by which will be shown the height of the water in the reheater H. A steam-pipe 12 connects the upper end of said water-gage with the upper passage of the corresponding pipe I, and a descending pipe 13 connects the same upper passage with an ordinary sewer-trap 14, a stop-valve 15 being interposed between said trap and the pipe 13 for the purpose of closing communication between them when required. One of the necks 2 is provided with a worm-wheel 16, into which a worm 17 engages to impart a rotatory motion to said reheater. A standing pipe 18 is fitted into the upper side of each of the pipes I to form a communication from each upper passage 6 with the interior of the reheater above the level of the water contained therein, so as to permit the pressure of steam in said reheater in the space above the water-level to be equalized from one end to the other of said reheater, and a safety-valve 19 is preferably fitted to communicate with one of said upper passages 6, to prevent an excessive pressure from being generated in said reheater. A series of metallic balls or rollers 20 is inserted in the reheater H, and the rolling motion of said balls produced by the revolving of said reheater prevents the formation of scale therein and pulverizes any solid matter that might be deposited in said reheater. A waste-pipe 21 connects the upper passage of the pipe I at the discharge end of the reheater H with the sewer-trap 14. The pipes 13 and 21 and the sewer-trap 14 effects the drainage of any water from the upper passages 6 that may accumulate therein. The reheater H is contained in a furnace J, which is preferably constructed of brick-work, and in said furnace there is a fire-chamber 22, of which the fire-bed is formed of grate-bars in the usual manner. At the rear end of said fire-chamber there is a bridge-wall 23, by which the products of combustion are compelled to pass upwardly toward the upper part of the furnace J, and rearwardly from said bridge-wall there is a hanging partition 24, which is parallel with said bridge-wall and by which the products of combustion, after passing over the top of the bridge-wall 23, are deflected downwardly in contact with the lower part of the reheater H, after which said products of combustion pass upwardly to an outlet-flue 25, through which they may escape into the atmosphere. The course of the products of combustion is indicated by arrows in Fig. 2, and in pursuing said course the heat is brought into contact with the entire surface of the reheater exposed in said furnace.

K is a filtering apparatus in which the feed-water is purified by passing downwardly through the filtering material, and the latter is cleansed by passing water upwardly therethrough. Said filtering apparatus constitutes no part of this present invention, but will be found fully described in Letters Patent of the United States No. 352,943, granted to me November 23, 1886. Said filtering apparatus is connected to the reheater H by a pipe 26, which runs from the discharge end of said reheater into the top of the filter, and said pipe is provided with a stop-valve 27, by which the communication between the reheater and filter can be shut off when occasion requires. To the lower part of the filter K is attached a pipe 28, for conveying the filtered water into the boiler B, and said pipe is provided with a stop-valve 29, by which communication through said pipe may be closed close to the filter. Said pipe is also preferably provided with a safety-valve 30, a check-valve 31, and a stop-valve 32, the latter being located between said check-valve and boiler. A pipe 33 connects the lower end of the filter K with the street-mains or other source of water-supply, for the purpose of furnishing water to said filter for the purpose of washing the filtering material contained in the filter. The pipe 33 is preferably made to enter the same opening in the filter that the pipe 28 is connected to, and a stop-valve 34 is inserted in the pipe 33 for the purpose of shutting off the flow of water through said pipe when occasion requires. A waste-pipe 35 is connected to the upper part of the filter K for the purpose of carrying off any dirt or impurities that may be washed from the filtering material. Said waste-pipe should be connected with a suitable drain or sewer, and it is provided with a stop-valve 36, for closing communication therethrough.

This apparatus operates as follows: The exhaust-steam from the engine A passes into the heater D through the pipe E, and the feed-water is forced into said heater by the pump G or other suitable appliance, said exhaust-steam and feed-water not being allowed to commingle in said heater, and the feed-water is heated in the latter by the heat radiated by said exhaust-steam. The heated feed-water is taken from the upper part of said heater through the pipe E and conducted into an adjacent end of the revolving reheater H, under which a fire is maintained in the fire-chamber 22, and by the action of said fire the temperature of said feed-water is raised to such a degree that any impurities that are held in solution therein will be precipitated, and in case said impurities assume the form of scale or other solid matter the rolling balls 20 will reduce the impurities to powder, that will be held in suspension in said feed-water and will be carried by the outflowing current into the filter K, wherein said impurities will be separated from the water and deposited in the filtering material, and the purified water, highly heated, will be conducted into the boiler B through the pipe 28. When the filtering material becomes so filled with the deposited impurities as to render it useless for the time in effecting the proper purification of the feed-water, the pump G should be stopped from running, the stop-valves 27 and 29 closed, and the stop-valves 34 and 36 opened, thereby allowing a current of water from the pipe 33 to flow into the lower end of the filter K. Said current of water will pass upwardly through the filtering material and wash out the deposited impurities therefrom, and the contaminated water will escape through the waste-pipe 35, to be carried away through a suitable drain or sewer. The revolving reheater H may be used, in combination with a filter and pump, in factories where other motive power than a steam-engine is employed, but a steam-boiler is used, and in such cases the revolving reheater will be utilized for heating the feed-water and preventing the formation of scale, and in some cases—as when the feed-water is not impregnated with scale-forming impurities, but does contain impurities held in solution—the metallic balls or rollers may be omitted from said reheater, the impurities precipitated by the heat from the furnace, as hereinbefore described, being removed from the feed-water by filtration.

What I claim as my invention, and desire to secure by Letters Patent, is—

1. In an apparatus for heating and purifying feed-water for steam-boilers, a revolving heater containing a series of balls or rollers and provided with inlet and outlet water-pipes, said heater being fitted to rotate over the fire of a furnace, as and for the purpose herein specified.

2. The combination with a steam engine and boiler, of a water-feeding device, a heater in which the feed-water is primarily heated by the exhaust-steam from said engine, a revolving reheater which is exposed to the action of a fire, and a filter fixed between said reheater and boiler, as and for the purpose herein specified.

3. The combination, with a steam engine and boiler, of a water-feeding device, a heater in which the feed-water is primarily heated by the exhaust-steam from said engine, a revolving reheater containing a series of balls or rollers and exposed to the action of a fire, and a filter fixed between said reheater and boiler, as and for the purpose herein specified.

JAMES H. BLESSING.

Witnesses:
JOHN W. WHEELOCK,
WM. H. LOW.